United States Patent
Kim et al.

(10) Patent No.: US 11,645,361 B2
(45) Date of Patent: May 9, 2023

(54) APPARATUS AND METHOD OF IMAGE CLUSTERING

(71) Applicant: SAMSUNG SDS CO., LTD., Seoul (KR)

(72) Inventors: Byoung Jip Kim, Seoul (KR); Jin Ho Choo, Seoul (KR); Yeong Dae Kwon, Seoul (KR); Il Joo Yoon, Seoul (KR); Du Won Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 346 days.

(21) Appl. No.: 17/148,926

(22) Filed: Jan. 14, 2021

(65) Prior Publication Data

US 2022/0129705 A1   Apr. 28, 2022

(30) Foreign Application Priority Data

Oct. 22, 2020   (KR) .................. 10-2020-0137877

(51) Int. Cl.
  *G06F 16/55*   (2019.01)
  *G06F 18/214*   (2023.01)
  (Continued)

(52) U.S. Cl.
  CPC .......... *G06F 18/2155* (2023.01); *G06F 16/55* (2019.01); *G06F 18/23213* (2023.01); *G06N 3/08* (2013.01)

(58) Field of Classification Search
  CPC .............. G06F 18/2155; G06F 16/55; G06F 18/23213; G06F 18/214; G06F 18/2413;
  (Continued)

(56) References Cited

U.S. PATENT DOCUMENTS

2020/0327311 A1*  10/2020  Xu ..................... G06N 3/02
2021/0248736 A1*  8/2021  Kamen .............. G06T 7/0012
(Continued)

OTHER PUBLICATIONS

Hu, Qinghao, et al. "Pseudo label based unsupervised deep discriminative hashing for image retrieval." Proceedings of the 25th ACM international conference on Multimedia. 2017. (Year: 2017).*
(Continued)

*Primary Examiner* — Fayyaz Alam
(74) *Attorney, Agent, or Firm* — Sughrue Mion, PLLC

(57) ABSTRACT

An apparatus includes a modified image generator generating modified images by modifying each unlabeled image, a pre-trainer to generate a feature vector for each modified image by using an artificial neural network-based encoder and train the encoder based on the feature vector for each modified image, a pseudo-label generator to generate a feature vector for each unlabeled training image, cluster the training images based on the feature vector for each training image, and generate a pseudo-label for at least one training image among the training images based on the clustering result, and a further trainer to generate a predicted label by using the trained encoder and a classification model including a classifier to generate a predicted label for an image input to the trained encoder based on a feature vector, and train the classification model based on the pseudo-label and predicted label for the at least one training image.

16 Claims, 5 Drawing Sheets

(51) Int. Cl.
 *G06N 3/08* (2023.01)
 *G06F 18/23213* (2023.01)

(58) Field of Classification Search
 CPC .......... G06N 3/08; G06N 3/045; G06N 3/088;
 G06N 20/00; G06V 10/454; G06V
 10/762; G06V 10/7753; G06V 10/82;
 G06V 10/469
 See application file for complete search history.

(56) References Cited

U.S. PATENT DOCUMENTS

2021/0327029 A1* 10/2021 Chen ................... G06T 5/002
2022/0101112 A1* 3/2022 Brown .................. G10L 15/16

OTHER PUBLICATIONS

Chakraborty, Souradip, Aritra Roy Gosthipaty, and Sayak Paul. "G-SimCLR: Self-supervised contrastive learning with guided projection via pseudo labelling." 2020 International Conference on Data Mining Workshops (ICDMW). IEEE, 2020. (Year: 2020).*

* cited by examiner

APPARATUS AND METHOD OF IMAGE CLUSTERING

CROSS-REFERENCE TO RELATED APPLICATION(S)

This application claims the benefit under 35 USC § 119(a) of Korean Patent Application No. 10-2020-0137877, filed on Oct. 22, 2020, in the Korean Intellectual Property Office, the entire disclosure of which is incorporated herein by reference for all purposes.

BACKGROUND

1. Field

The following description relates to an image clustering technique.

2. Description of Related Art

Conventional clustering techniques, such as k-means clustering and hierarchical density-based spatial clustering of applications with noise (HDBSCAN), have a problem of low performance in handling high-dimensional data.

Recently, to address this problem, deep-learning based methods for improving the clustering performance of images including high-dimensional data have been proposed.

Existing methods are largely classified into generative methods and discriminative methods. The generative method is a method using an encoder and a decoder, and the discriminative method is a method using only an encoder. The existing methods relay on a soft label or pseudo label so that the difference between clusters cannot be properly learned, which leads to the degradation of clustering performance.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an apparatus and method for image clustering.

In one general aspect, there is provided an apparatus for image clustering including: a modified image generator configured to generate a plurality of modified images by modifying each of a plurality of unlabeled original images; a pre-trainer configured to generate a feature vector for each of the plurality of modified images by using an artificial neural network (ANN)-based encoder and train the encoder based on the feature vector for each of the plurality of modified images; a pseudo-label generator configured to generate a feature vector for each of a plurality of unlabeled training images by using the trained encoder, cluster the plurality of training images based on the feature vector for each of the plurality of training images, and generate a pseudo-label for one or more training image among the plurality of training images based on the clustering result; and a further trainer configured to generate a predicted label for the one or more training image by using the trained encoder and a classification model including a classifier that generate a predicted label for an image input to the trained encoder based on a feature vector generated by the trained encoder, and train the classification model based on the pseudo-label and predicted label for the one or more training image.

The encoder may additionally perform one or more multi-layer perceptron (MLP) operation using the feature vector and obtain an orthogonal projection vector.

The pre-trainer may train the encoder using a contrastive loss function based on a similarity between feature vectors generated for each of a plurality of modified images obtained from the same original image among the plurality of modified images and a similarity between feature vectors generated for each of a plurality of modified images obtained from different original images among the plurality of modified images.

The pre-trainer may train the encoder such that the feature vectors generated for each of the plurality of modified images obtained from the same original image become similar to one another and the feature vectors generated for each of the plurality of modified images obtained from different original images become different from one another.

The pseudo-label generator may execute a nonlinear dimensionality reduction (NLDR)-based dimensionality reduction network for each of the plurality of unlabeled training images input to the trained encoder.

The pseudo-label generator may update the plurality of training images based on a confidence corresponding to the generated pseudo-label.

The further trainer may further train the trained encoder such that a loss function based on the pseudo-label and the predicted label is minimized.

The further trainer may update the pseudo-label using the further trained encoder and further train the classification model based on the updated pseudo-label and the further trained encoder.

In another general aspect, there is provided a method for image clustering including: generating a plurality of modified images by modifying each of a plurality of unlabeled original images; generating a feature vector for each of the plurality of modified images by using an ANN-based encoder, and training the encoder based on the feature vector for each of the plurality of modified images; generating a feature vector for each of a plurality of unlabeled training images using the trained encoder, clustering the plurality of training images based on the feature vector for each of the plurality of training images, and generating a pseudo-label for one or more training image among the plurality of training images based on the clustering result; and generating a predicted label for the one or more training image by using the trained encoder and a classification model including a classifier that generate a predicted label for an image input to the trained encoder based on a feature vector generated by the trained encoder, and training the classification model based on the pseudo-label and predicted label for the one or more training image.

The training of the encoder may include additionally performing one or more MLP operation using the feature vector and obtain an orthogonal projection vector.

The training of the encoder may include training the encoder using a contrastive loss function based on a similarity between feature vectors generated for each of a plurality of modified images obtained from a same original image among the plurality of modified images and a similarity between feature vectors generated for each of a plurality of modified images obtained from different original images among the plurality of modified images.

The training of the encoder may include training the encoder such that the feature vectors generated for each of the plurality of modified images obtained from the same original image become similar to one another and the feature vectors generated for each of the plurality of modified images obtained from different original images become different from one another.

The generating of the pseudo-label may include executing an NLDR-based dimensionality reduction network for each of the plurality of unlabeled training images input to the trained encoder.

The generating of the pseudo-label may include updating the plurality of training images based on a confidence corresponding to the generated pseudo-label.

The further training may include further training the trained encoder such that a loss function based on the pseudo-label and the predicted label is minimized.

The further training may include updating the pseudo-label using the further trained encoder and further training the classification model based on the updated pseudo-label and the further trained encoder.

Other features and aspects will be apparent from the following detailed description, the drawings, and the claims.

Figure 1:
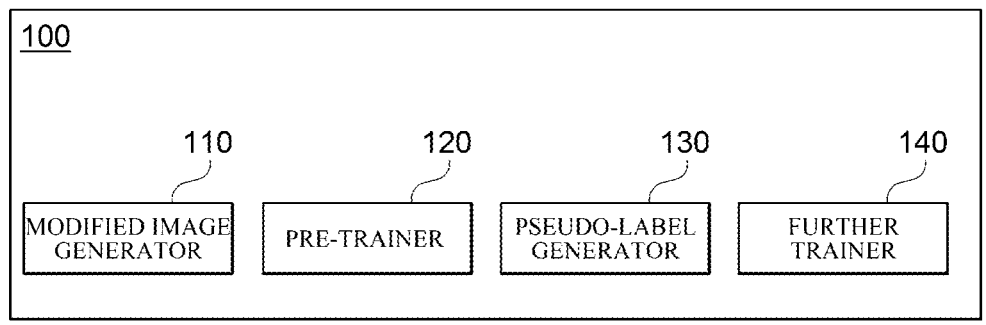
FIG. 1 is a block diagram illustrating a configuration of an apparatus for image clustering according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, specific exemplary embodiments of the present disclosure will be described with reference to the drawings. The following detailed description is provided to assist in comprehensive understanding of methods, apparatuses, and/or systems described herein. However, this is merely an example, and the present disclosure is not limited thereto.

When detailed description of known art related to the present disclosure is determined to unnecessarily obscure the subject matter of the present disclosure in describing exemplary embodiments of the present disclosure, the detailed description will be omitted. The terms to be described below are terms defined in consideration of functions in the present disclosure and may be changed according to an intention of a user or an operator or practice. Therefore, definitions thereof will be determined based on content of the entire specification. The terms used in the detailed description are merely intended to describe the exemplary embodiments of the present disclosure and should not be limited in any way. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, operations, operations, elements, and/or components, but do not preclude the presence or addition of one or more other features, integers, operations, operations, elements, components, and/or groups thereof.

FIG. 1 is a block diagram illustrating a configuration of an apparatus for image clustering according to an exemplary embodiment.

FIG. 1 is a block diagram for describing an apparatus 100 for image clustering according to one embodiment.

As illustrated, the apparatus 100 for image clustering according to one embodiment includes a modified image generator 110, a pre-trainer 120, a pseudo-label generator 130, and a further trainer 140.

According to one embodiment, the modified image generator 110, the pre-trainer 120, the pseudo label generator 130, and the further trainer 140 may be implemented using one or more physically separated devices, or by one or more processor or a combination of one or more processors and software, and specific operations thereof may not be clearly distinguished, unlike the illustrated example.

The modified image generator 110 generates a plurality of modified images by modifying each of a plurality of unlabeled original images.

According to one embodiment, the modified image generator 110 may generate a modified image based on one or more of image cropping, image resizing, and color transformation of an original image.

Specifically, 2N modified images may be generated based on one or more of image cropping, image resizing, and color transformation of N unlabeled original images. In other words, a total of 2N modified images may be generated including N modified images cropped from the upper right portion of the respective N unlabeled images and N modified images cropped from the lower left portion of the respective N unlabeled images.

The pre-trainer 120 generates feature a vector for each of the plurality of modified images using an artificial neural network (ANN)-based encoder, and trains the encoder based on the feature vector for each of the plurality of modified images.

According to one embodiment, the pre-trainer 120 may include an encoder that generates a feature vector of a modified image based on a convolutional neural network (CNN)-based vector compression network structure.

According to one embodiment, the pre-trainer 120 may additionally perform one or more multi-layer perceptron (MLP) operation using the feature vector and obtain an orthogonal projection vector.

In addition, the feature vector described below may mean an orthogonal projection vector obtained based on one or more MLP operations using the feature vector.

According to one embodiment, the pre-trainer 120 may be trained using a contrastive loss function based on a similarity between feature vectors generated for each of a plurality of modified images obtained from the same original image and a similarity between feature vectors generated for each of a plurality of modified images obtained from a plurality of different original images.

According to one embodiment, the pre-trainer 120 may group similar images among the plurality of modified images based on a contrastive self-supervised learning model. The contrastive self-supervised learning model is an ANN-based model that is pre-trained to distinguish differences between a plurality of modified images.

According to one embodiment, the pre-trainer 120 may train the encoder such that the feature vectors generated for each of the plurality of modified images obtained from the same original image become similar to one another and the feature vectors generated for each of the plurality of modified images obtained from different original images become different from one another.

Specifically, according to one embodiment, the contrastive loss function for similarity update may be defined as, for example, Equation 1 below.

$$\mathcal{L}_{contra} = l_{i,j} = -\log \frac{\exp\left(\frac{sim(z_i, z_j)}{\tau}\right)}{\sum_{k=1}^{2N} \alpha \exp\left(\frac{sim(z_i, z_j)}{\tau}\right)} \quad [\text{Equation 1}]$$

$$\alpha = \begin{cases} 0, & k = i \\ 1, & k \neq i \end{cases}$$

In Equation 1, when a feature vector for each of N modified images cropped from the upper right portion of N unlabeled images is $Z_i$ and a feature vector for each of N modified images cropped from the lower left portion of N unlabeled images is $Z_j$, $L_{contra}$ represents a contrastive loss function of a pre-training model that distinguishes differences between individual images based on a similarity.

In this case, in order to avoid learning on the same modified image, only in a case of different modified images k≠i where α=1, the contrastive loss function is learned, and in the case of the same modified image k=i, where α=0, the contrastive loss function is not learned.

The feature vectors may be updated such that the similarity between feature vectors $Z_i$ and $Z_j$ of the modified images increases based on numerator $$\exp\left(\frac{sim(z_i, z_j)}{\tau}\right)$$

of the contrastive loss function when the modified images are generated from the same original image and the similarity between feature vectors $Z_i$ and $Z_k$ of the modified images decreases based on denominator $$\sum_{k=1}^{2N} \alpha \exp\left(\frac{sim(z_i, z_j)}{\tau}\right)$$

when the modified images are generated from different original images.

In this case, τ may be set according to characteristics of a plurality of original images and may have a value ranging 0.5≤τ≤0.7 as a constant value for maximizing the similarity.

The pseudo-label generator 130 generates a feature vector for each of the plurality of unlabeled training images using the trained encoder, clusters the plurality of training images based on the feature vector for each of the plurality of training images, and generates a pseudo-label for one or more training image among the plurality of training images based on the clustering result.

According to one embodiment, the pseudo-label generator 130 may include a nonlinear dimensionality reduction (NLDR)-based dimensionality reduction network structure for each of a plurality of unlabeled training images input to the trained encoder.

According to one embodiment, the pseudo-label generator 130 may update the plurality of training images based on a confidence corresponding to the pseudo-label generated based on the clustering result.

The further trainer 140 generates a predicted label for one or more training image by using a trained encoder and a classification model including a classifier that generates a predicted label for an image input to the trained encoder based on the feature vector generated by the trained encoder, and trains the classification model based on the pseudo-label and predicted label for one or more training image.

According to one embodiment, the further trainer 140 may further train the trained encoder such that a loss function based on the pseudo-label and the predicted label is minimized.

Specifically, according to one embodiment, the loss function for improving the performance of the classifier for image classification may be defined as, for example, Equation 2 below.

$$H(p, q) = -\sum_{x \in X} p(x) \log q(x) \quad [\text{Equation 2}]$$

In Equation 2, where a feature vector for each of the plurality of training images is generated using the trained encoder, a pseudo-label generated based on a clustering result of the feature vectors of the plurality of training images is p(x), and a predicted label for the trained encoder and a classification model for an image input to the trained encoder based on the feature vector generated by the trained encoder is q(x), H(p, q) represents a loss function that minimizes errors of the pseudo-label p(x) and the predicted label q(x) based on a cross entropy loss function.

According to one embodiment, the further trainer 140 may update the predicted label q(x) to minimize a difference between the predicted label q(x) and the pseudo-label p(x).

Also, the further trainer 140 may further train the trained encoder based on the updated predicted label.

According to one embodiment, the further trainer 140 may update the pseudo-label p(x) using the further trained encoder, and may further train the classification model based on the updated pseudo-label p(x) and the further trained encoder.

Figure 2:
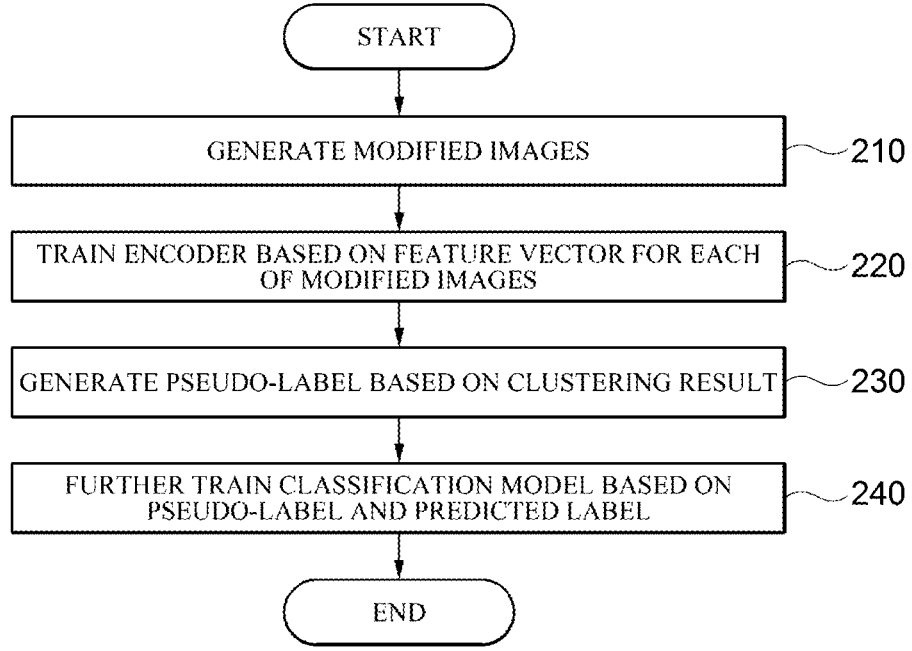
FIG. 2 is a flowchart illustrating a method for image clustering according to one embodiment.

FIG. 2 is a flowchart illustrating a method for image clustering according to one embodiment.

The method shown in FIG. 2 may be performed, for example, by the clustering apparatus 100 shown in FIG. 1.

Referring to FIG. 2, first, the clustering apparatus 100 generates a plurality of modified images by modifying each of a plurality of unlabeled original images (210).

According to one embodiment, the modified image generator 110 may generate a modified image based on one or more of image cropping, image resizing, and color transformation of an original image.

Specifically, 2N modified images may be generated based on one or more of image cropping, image resizing, and color transformation of N unlabeled original images. In other words, a total of 2N modified images may be generated including N modified images cropped from the upper right portion of the respective N unlabeled images and N modified images cropped from the lower left portion of the respective N unlabeled images.

Thereafter, the clustering apparatus 100 generates a feature vector for each of the plurality of modified images using an ANN-based encoder, and trains the encoder based on the feature vector for each of the plurality of modified images (220).

According to one embodiment, the clustering apparatus 100 may include an encoder that generates a feature vector of a modified image based on a CNN-based vector compression network structure.

According to one embodiment, the clustering apparatus 100 may additionally perform one or more MLP operation using the feature vector and additionally obtain an orthogonal projection vector.

In addition, the feature vector described below may mean an orthogonal projection vector obtained based on one or more MLP operations using the feature vector.

According to one embodiment, the clustering apparatus 100 may be trained using a contrastive loss function based on a similarity between feature vectors generated for each of a plurality of modified images obtained from the same original image and a similarity between feature vectors generated for each of a plurality of modified images obtained from a plurality of different original images.

According to one embodiment, the clustering apparatus 100 may group similar images for each of the plurality of modified images based on a contrastive self-supervised learning model. The contrastive self-supervised learning model means an ANN-based model that is pre-trained to distinguish differences between a plurality of modified images.

According to one embodiment, the clustering apparatus 100 may be trained such that the feature vectors generated for each of the plurality of modified images obtained from the same original image become similar to one another and the feature vectors generated for each of the plurality of modified images obtained from different original images become different from one another.

Thereafter, the clustering apparatus 100 generates a feature vector for each of the plurality of unlabeled training images using the trained encoder, clusters the plurality of training images based on the feature vectors for each of the plurality of training images, and generates a pseudo-label for one or more training image among the plurality of training images based on the clustering result (230).

According to one embodiment, the clustering apparatus 100 may include an NLDR-based dimensionality reduction network structure for each of the plurality of unlabeled training images input to the trained encoder.

According to one embodiment, the clustering apparatus 100 may update the plurality of training images based on a confidence corresponding to a pseudo-label generated based on a clustering result.

Thereafter, the clustering apparatus 100 generates a predicted label for one or more training image by using the trained encoder and the classification model including a classifier that generates a predicted label for an image input to the trained encoder based on the feature vector generated by the trained encoder, and train the classification model based on the pseudo-label and predicted label for one or more training image (240).

According to one embodiment, the clustering apparatus 100 may further train the trained encoder such that a loss function based on the pseudo-label and the predicted label is minimized.

According to one embodiment, the predicted label may be updated to minimize a difference between the predicted label and the pseudo-label.

Also, the clustering apparatus 100 may further train the trained encoder based on the updated predicted label.

According to one embodiment, the clustering apparatus 100 may update the pseudo-label using the further trained encoder, and may further train the classification model based on the updated pseudo-label and the further trained encoder.

Figure 3:
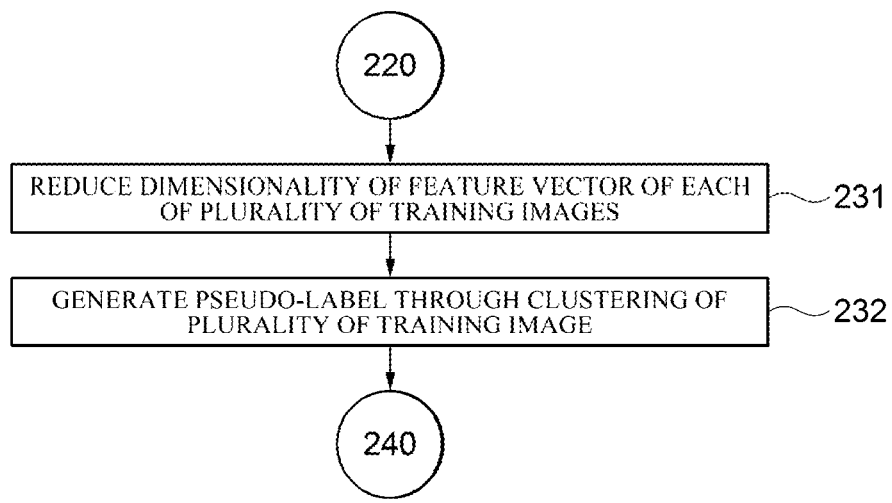
FIG. 3 is a flowchart illustrating a method of generating a pseudo label for image clustering according to one embodiment.

FIG. 3 is a flowchart illustrating a method of generating a pseudo label for image clustering according to one embodiment.

The method shown in FIG. 3 may be performed, for example, by the clustering apparatus 100 shown in FIG. 1.

Referring to FIG. 3, first, the clustering apparatus 100 generates the feature vector for each of a plurality of unlabeled training images using the trained encoder, and reduces the dimensionality of the feature vector based on the NLDR-based dimensionality reduction network structure (231).

Thereafter, the clustering apparatus 100 clusters the plurality of training images based on the dimensionality-reduced feature vectors, and generates a pseudo-label for one or more training image among the plurality of training images based on the clustering result (232).

According to one embodiment, the clustering apparatus 100 may generate a pseudo-label corresponding to a central cluster based on the clustering result, and may update the plurality of training images based on a confidence corresponding to the pseudo-label.

Figure 4:
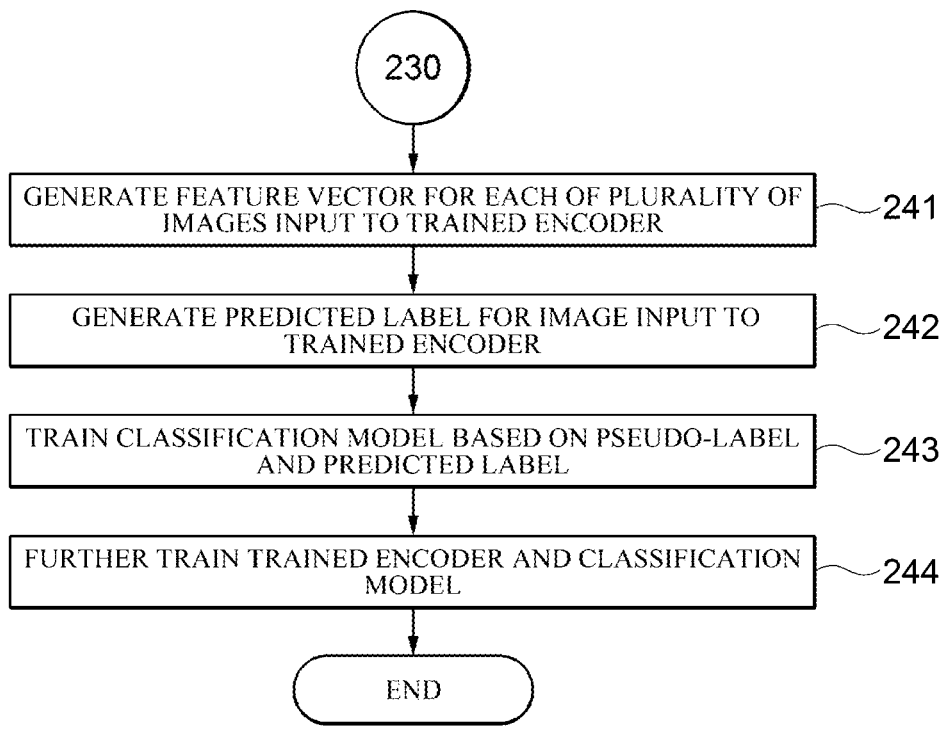
FIG. 4 is a flowchart illustrating a further training method for image clustering according to one embodiment.

FIG. 4 is a flowchart illustrating a further training method for image clustering according to one embodiment.

The method illustrated in FIG. 4 may be performed by, for example, the clustering method 100 illustrated in FIG. 1.

Referring to FIG. 4, first, the clustering apparatus 100 generates a feature vector for each of the plurality of unlabeled training images using the trained encoder (241).

Thereafter, the clustering apparatus 100 generates a predicted label for one or more training image by using the trained encoder and a classification model including a classifier that generates a predicted label of an image input to the trained encoder based on the feature vector generated by the trained encoder (242).

Thereafter, the classification model is trained based on the pseudo-label and predicted label for one or more training image (243).

According to one embodiment, the clustering apparatus 100 may further train the trained encoder such that a loss function based on the pseudo-label and the predicted label is minimized.

In addition, the clustering apparatus 100 may update the predicted label to minimize the differences between the predicted label and the pseudo-label.

Thereafter, the trained encoder is further trained based on the updated predicted label, the pseudo-label is updated using the further trained encoder, and the classification model is further trained based on the updated pseudo-label and the further trained encoder (244).

Meanwhile, in the flowcharts illustrated in FIGS. 2 to 4, at least some of the operations may be performed in different order or may be combined into fewer operations or further divided into more operations. In addition, some of the operations may be omitted, or one or more extra operations, which are not illustrated, may be added to the flowchart and be performed.

Figure 5:
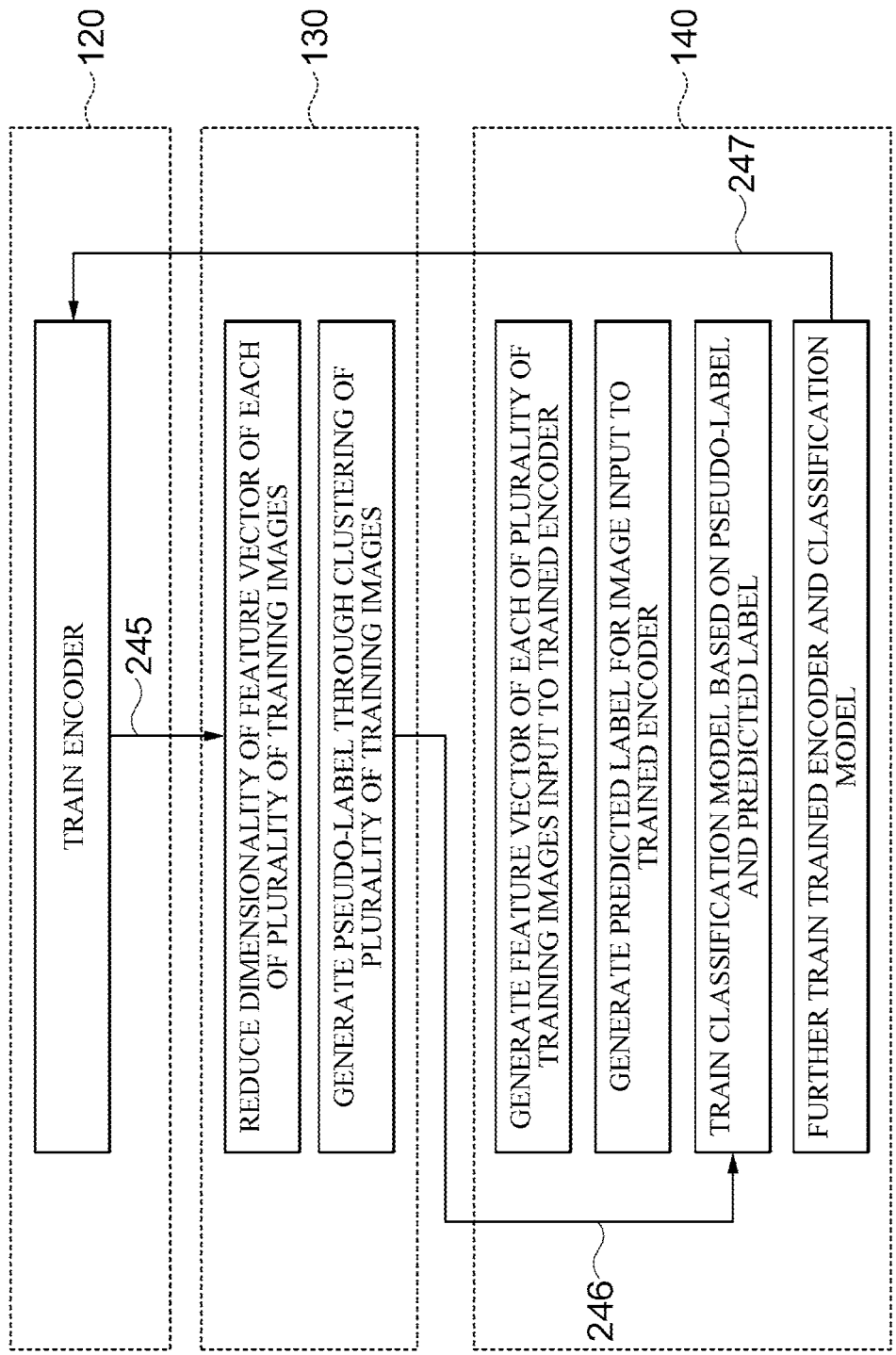
FIG. 5 is a diagram schematically showing structures of a pseudo-label generator and a further trainer according to one embodiment.

FIG. 5 is a diagram schematically illustrating structures of a pseudo-label generator and a further trainer according to one embodiment.

The method illustrated in FIG. 5 may be performed, for example, by the pre-trainer 120, the pseudo-label generator 130, and the further trainer 140 of the clustering apparatus 100 illustrated in FIG. 1.

Referring to FIG. 5, the pre-trainer 120 of the clustering apparatus 100 may generate a feature vector for each of a plurality of modified images using an ANN-based encoder, and train the encoder based on the feature vector for each of the plurality of modified images (245).

The pseudo-label generator 130 of the clustering apparatus 100 may perform dimensionality reduction of the feature vector for each of the plurality of training images, cluster the plurality of training images using the dimensionality-reduced feature vectors, and generate a pseudo-label for one or more training image among the plurality of training images based on the clustering result (246).

The further trainer 140 of the clustering apparatus 100 may generate a predicted label for one or more training image by using the trained encoder and a classification model including a classifier that generates a predicted label for an image input to the trained encoder based on the feature vector generated by the trained encoder, train the classification model based on the pseudo-label and predicted label for one or more training image, and further train the trained encoder such that a loss function based on the pseudo-label and the predicted label is minimized (247).

According to one embodiment, the clustering apparatus 100 may update the pseudo-label using the further trained encoder, and further train the classification model based on the updated pseudo-label and the further trained encoder.

Figure 6:
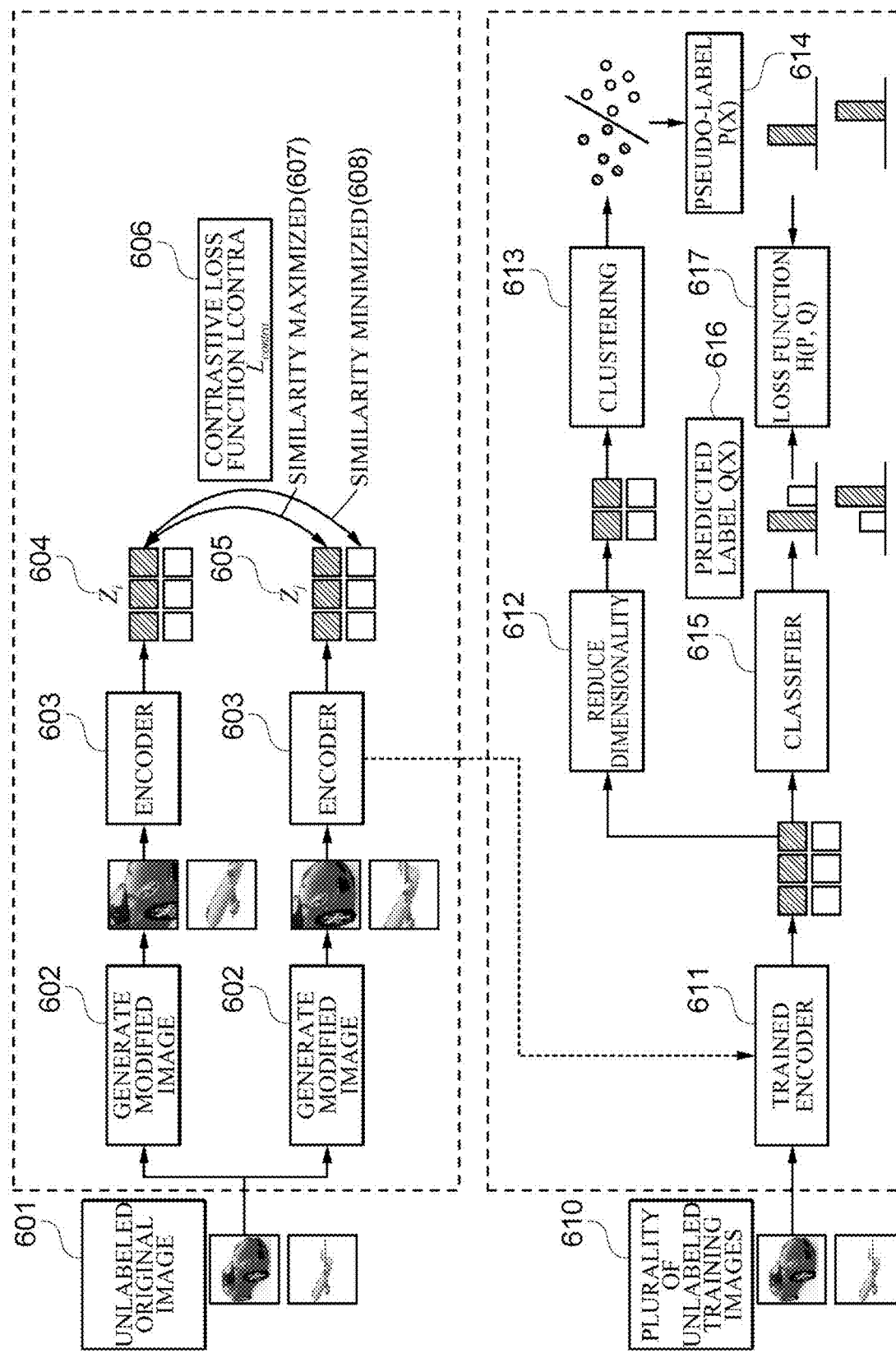
FIG. 6 is a diagram schematically showing a structure of a method for image clustering according to one embodiment.

FIG. 6 is a diagram schematically illustrating a method for image clustering according to one embodiment.

The method shown in FIG. 6 may be performed, for example, by the clustering apparatus 100 illustrated in FIG. 1.

Referring to FIG. 6, the clustering apparatus 100 may generate a plurality of modified images 602 by modifying each of a plurality of unlabeled original images 601, generate a feature vector $Z_i$ 604 and a feature vector $Z_j$ 605 for each of the plurality of modified images by using an ANN-based encoder 603, and train the encoder based on the feature vector for each of the plurality of modified images.

In this case, the encoder based on a contrastive loss function $L_{contra}$ 606 may be trained such that the feature vectors generated for each of the plurality of modified images obtained from the same original image become similar to one another (607) and the feature vectors generated for each of the plurality of modified images obtained from different original images become different from one another (608).

Thereafter, the clustering apparatus 100 may generate a feature vector for each of the plurality of unlabeled training images 610 using the trained encoder 611, and reduce the dimensionality of the feature vector (612) for each of the plurality of training images, perform clustering (613) on a plurality of training images based on the reduced-dimensional feature vectors, and generate a pseudo-label 614 for one or more training image among the plurality of training images based on the clustering result.

A predicted label q(x) 616 for one or more training image may be generated using the trained encoder 611 and a classification model including a classifier 615 that generates a predicted label for an image input to the trained encoder 611 based on the feature vector generated by the trained encoder 611, and the classification model based on a loss function H(p, q) 617 may be trained using the pseudo-label p(x) 614 and a predicted label q(x) 616 for one or more training images.

Figure 7:
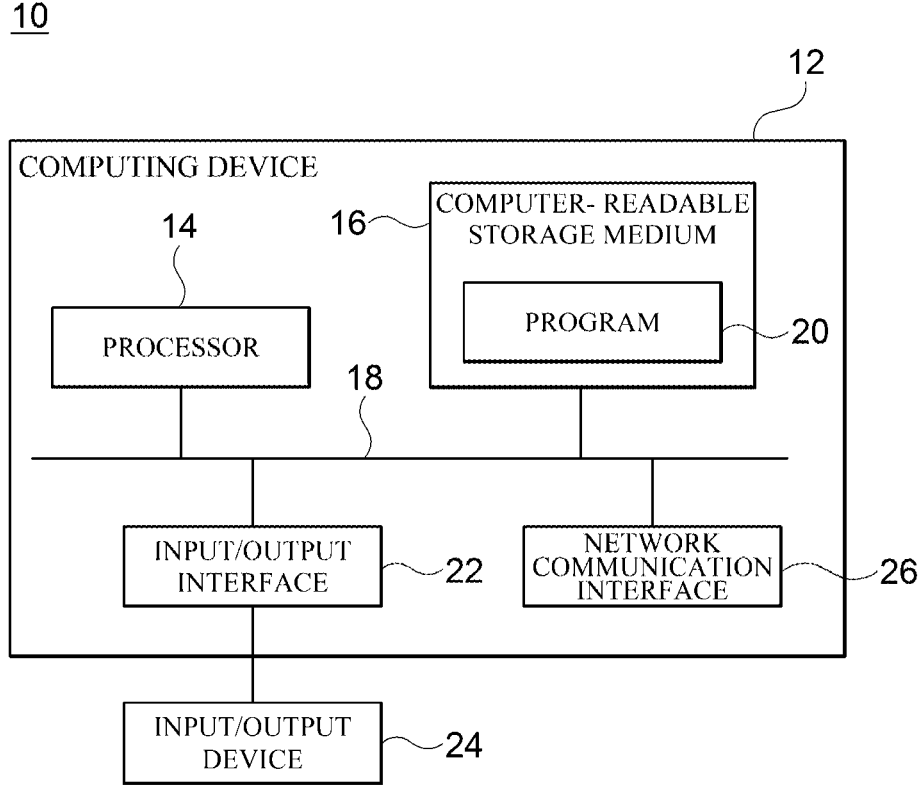
FIG. 7 is a block diagram illustrating an example of a computing environment including a computing device according to one embodiment.

FIG. 7 is a block diagram illustrating an example of a computing environment including a computing device suitable for use in example embodiments.

FIG. 7 is a block diagram illustrating an example of a computing environment including a computing device suitable for use in example embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in the clustering apparatus 100 illustrated in FIG. 1.

The computing device 12 includes one or more processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiments, the performance of image clustering may be improved by using a contrastive self-supervised learning model.

In addition, according to the disclosed embodiments, a pre-training model for grouping images based on a similarity may be generated using contrastive learning to distinguish differences between individual images.

Further, according to the disclosed embodiments, a NLDR-based dimensionality reduction network is executed, thereby preventing performance degradation for high-dimensional data which is caused by application of conventional k-means clustering or HDBSCAN clustering technology.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for image clustering, the apparatus comprising:
a modified image generator configured to generate a plurality of modified images by modifying each of a plurality of unlabeled original images;
a pre-trainer configured to generate a feature vector for each of the plurality of modified images by using an artificial neural network (ANN)-based encoder and train the encoder based on the feature vector for each of the plurality of modified images;
a pseudo-label generator configured to generate a feature vector for each of a plurality of unlabeled training images by using the trained encoder, cluster the plurality of training images based on the feature vector for each of the plurality of training images, and generate a pseudo-label for one or more training image among the plurality of training images based on the clustering result; and
a further trainer configured to generate a predicted label for the one or more training image by using the trained encoder and a classification model including a classifier that generate a predicted label for an image input to the trained encoder based on a feature vector generated by the trained encoder, and train the classification model based on the pseudo-label and predicted label for the one or more training image.

2. The apparatus of claim 1, wherein the encoder is configured to additionally perform one or more multi-layer perceptron (MLP) operation using the feature vector and obtain an orthogonal projection vector.

3. The apparatus of claim 1, wherein the pre-trainer is configured to train the encoder using a contrastive loss function based on a similarity between feature vectors generated for each of a plurality of modified images obtained from the same original image among the plurality of modified images and a similarity between feature vectors generated for each of a plurality of modified images obtained from different original images among the plurality of modified images.

4. The apparatus of claim 3, wherein the pre-trainer is configured to train the encoder such that the feature vectors generated for each of the plurality of modified images obtained from the same original image become similar to one another and the feature vectors generated for each of the plurality of modified images obtained from different original images become different from one another.

5. The apparatus of claim 1, wherein the pseudo-label generator is configured to execute a nonlinear dimensionality reduction (NLDR)-based dimensionality reduction network for each of the plurality of unlabeled training images input to the trained encoder.

6. The apparatus of claim 1, wherein the pseudo-label generator is configured to update the plurality of training images based on a confidence corresponding to the generated pseudo-label.

7. The apparatus of claim 1, wherein the further trainer is configured to further train the trained encoder such that a loss function based on the pseudo-label and the predicted label is minimized.

8. The apparatus of claim 7, wherein the further trainer is configured to update the pseudo-label using the further trained encoder and further train the classification model based on the updated pseudo-label and the further trained encoder.

9. A method for image clustering, comprising:
generating a plurality of modified images by modifying each of a plurality of unlabeled original images;
generating a feature vector for each of the plurality of modified images by using an artificial neural network (ANN)-based encoder, and training the encoder based on the feature vector for each of the plurality of modified images;
generating a feature vector for each of a plurality of unlabeled training images using the trained encoder, clustering the plurality of training images based on the feature vector for each of the plurality of training images, and generating a pseudo-label for one or more training image among the plurality of training images based on the clustering result; and
is generating a predicted label for the one or more training image by using the trained encoder and a classification model including a classifier that generate a predicted label for an image input to the trained encoder based on a feature vector generated by the trained encoder, and training the classification model based on the pseudo-label and predicted label for the one or more training image.

10. The method of claim 9, wherein the training of the encoder comprises additionally performing one or more multi-layer perceptron (MLP) operation using the feature vector and obtain an orthogonal projection vector.

11. The method of claim 9, wherein the training of the encoder comprises training the encoder using a contrastive loss function based on a similarity between feature vectors generated for each of a plurality of modified images obtained from a same original image among the plurality of modified images and a similarity between feature vectors generated for each of a plurality of modified images obtained from different original images among the plurality of modified images.

12. The method of claim 11, wherein the training of the encoder comprises training the encoder such that the feature vectors generated for each of the plurality of modified images obtained from the same original image become similar to one another and the feature vectors generated for each of the plurality of modified images obtained from different original images become different from one another.

13. The method of claim 9, wherein the generating of the pseudo-label comprises executing a nonlinear dimensionality reduction (NLDR)-based dimensionality reduction network for each of the plurality of unlabeled training images input to the trained encoder.

14. The method of claim 9, wherein the generating of the pseudo-label comprises updating the plurality of training images based on a confidence corresponding to the generated pseudo-label.

15. The method of claim 9, wherein the further training comprises further training the trained encoder such that a loss function based on the pseudo-label and the predicted label is minimized.

16. The method of claim 15, wherein the further training comprises updating the pseudo-label using the further trained encoder and further training the classification model based on the updated pseudo-label and the further trained encoder.

* * * * *